(12) United States Patent
Bjørnevik

(10) Patent No.: US 12,449,091 B2
(45) Date of Patent: Oct. 21, 2025

(54) ANTI-VIBRATION BRACKET FOR SUBSEA EQUIPMENT

(71) Applicant: Siemens Energy AS, Oslo (NO)

(72) Inventor: Silje Bjørnevik, Mosterhamn (NO)

(73) Assignee: Siemens Energy AS, Oslo (NO)

( * ) Notice: Subject to any disclaimer, the term of this patent is extended or adjusted under 35 U.S.C. 154(b) by 474 days.

(21) Appl. No.: 17/980,290

(22) Filed: Nov. 3, 2022

(65) Prior Publication Data
US 2023/0167942 A1    Jun. 1, 2023

(30) Foreign Application Priority Data
Nov. 29, 2021    (GB) ..................... 2117208

(51) Int. Cl.
*F16M 13/02*    (2006.01)
*F16F 1/38*    (2006.01)

(52) U.S. Cl.
CPC ........... *F16M 13/02* (2013.01); *F16F 1/3849* (2013.01)

(58) Field of Classification Search
None
See application file for complete search history.

(56) References Cited

U.S. PATENT DOCUMENTS

| | | | |
|---|---|---|---|
| 4,505,617 A | 3/1985 | Miller | |
| 4,657,116 A | 4/1987 | Gardner | |
| 4,705,331 A | 11/1987 | Britton | |
| 2001/0054675 A1* | 12/2001 | Cunningham | F16F 15/04 248/628 |
| 2008/0036200 A1 | 2/2008 | Fredo | |
| 2018/0051770 A1 | 2/2018 | Cerniway | |
| 2020/0370704 A1* | 11/2020 | Mooney | F16M 11/041 |

FOREIGN PATENT DOCUMENTS

| | | | | |
|---|---|---|---|---|
| CN | 102537203 A | * | 7/2012 | ............ F16F 1/3828 |
| CN | 107781509 A | * | 3/2018 | ................ F16L 1/26 |
| CN | 207466908 U | * | 6/2018 | ........... B63B 25/004 |
| CN | 104220851 B | * | 11/2018 | ................ G01F 1/34 |
| CN | 209745511 U | | 12/2019 | |

(Continued)

OTHER PUBLICATIONS

CN-104220851-B: English Machine Translation (Year: 2018).*

(Continued)

*Primary Examiner* — Melanie Torres Williams
(74) *Attorney, Agent, or Firm* — Wolter Van Dyke Davis, PLLC

(57) ABSTRACT

A subsea equipment assembly includes a first component having an axis, a second component, and an anti-vibration bracket. The anti-vibration bracket is attached to the first component and the second component. In use the first component is caused to vibrate at least in a radial direction relative to the axis. The anti-vibration bracket includes a plate portion. The plate portion extends at least radially away from the first component and includes an attachment region located a radial distance away from the first component, the second component is attached to the attachment region. The anti-vibration bracket includes an array of slots, at least some of the slots of the array of slots are located between the first component and the attachment region.

17 Claims, 3 Drawing Sheets

(56) References Cited

FOREIGN PATENT DOCUMENTS

| | | |
|---|---|---|
| CN | 213021751 U | 4/2021 |
| FR | 2473654 A1 | 7/1981 |
| FR | 2855478 A1 | 12/2004 |
| FR | 2896021 A1 | 7/2007 |
| JP | 2000168676 A | 6/2000 |

OTHER PUBLICATIONS

CN-102537203-A: English Machine Translation (Year: 2017).*
CN-207466908-U: English Machine Translation (Year: 2018).*
CN-107781509-A: English Machine Translation (Year: 2018).*

* cited by examiner

ANTI-VIBRATION BRACKET FOR SUBSEA EQUIPMENT

CROSS REFERENCE TO RELATED APPLICATIONS

This application claims the benefit of United Kingdom Application No. GB 2117208.5 filed 29 Nov. 2021, incorporated by reference herein in its entirety.

FIELD OF INVENTION

The present invention relates to an anti-vibration bracket, in particular, but not exclusively, used for mounting components in subsea environments.

BACKGROUND

Equipment mounted on certain subsea installations are subject to vibration. Vibrations can damage both electronics and mechanical components over time and decrease their service life or even cause failure of the equipment. Vibrations can cause bolts to fail, and welds can suffer fatigue while exposed to vibrations over time. Known elastomeric vibration dampeners are not suitable for subsea applications because the elastomer dissolves in seawater over time.

SUMMARY OF INVENTION

Thus, an object of the present invention is to dampen vibrations emanating from a component to another component mounted thereto.

The above objects are achieved by a subsea equipment assembly comprising a first component having an axis, a second component and an anti-vibration bracket. The anti-vibration bracket is attached to the first component and the second component. In use the first component is caused to vibrate at least in a radial direction relative to the axis. The anti-vibration bracket comprises a plate portion. The plate portion extends at least radially away from the first component and comprises an attachment region located a radial distance away from the first component. The second component is attached to the attachment region. Wherein, the anti-vibration bracket comprises an array of slots. At least some of the slots of the array of slots are located between the first component and the attachment region.

At least some of the slots of the array of slots may be located radially outwardly of the attachment region.

At least some of the slots of the array of slots may be located to a lateral side of the attachment region.

At least some of the slots of the array of slots may be arranged in at least one row with respect to the radial direction.

At least some of the slots of the array of slots may be arranged in at least two rows with respect to the radial direction.

The array of slots may be arranged such that any radial line passes through at least one of the slots and either a contact point between the anti-vibration bracket and the first component or where the anti-vibration bracket is attached to the first component.

At least some of the slots of the array of slots may be arranged such that their centreline is at an angle to a radial line. The angle may be between −45° and +45°, preferably between −15° and +15°.

At least some of the slots of the array of slots may be curved. Preferably, at least some of the slots of the array of slots may have a curvature with a constant radius and preferably a radius from the axis.

The anti-vibration bracket may comprise an edge region and none of the slots the array of slots are within the edge region.

At least some of slots of the array of slots may extend through the anti-vibration bracket.

At least some of slots of the array of slots may extend partly through the anti-vibration bracket.

The first component may be a venturi flow meter and the second component may be a differential pressure sensor.

At least some of the slots of the array of slots may have an aspect ratio between and including 2 and 20.

A radial line from the axis may pass through the slots.

The slots may be located between the first component and the attachment region.

BRIEF DESCRIPTION OF THE DRAWINGS

The above-mentioned attributes and other features and advantages of the present invention and the manner of attaining them will become more apparent and the present technique itself will be better understood by reference to the following description of embodiments of the present technique taken in conjunction with the accompanying drawings, wherein.

DETAILED DESCRIPTION OF INVENTION

Figure 1:
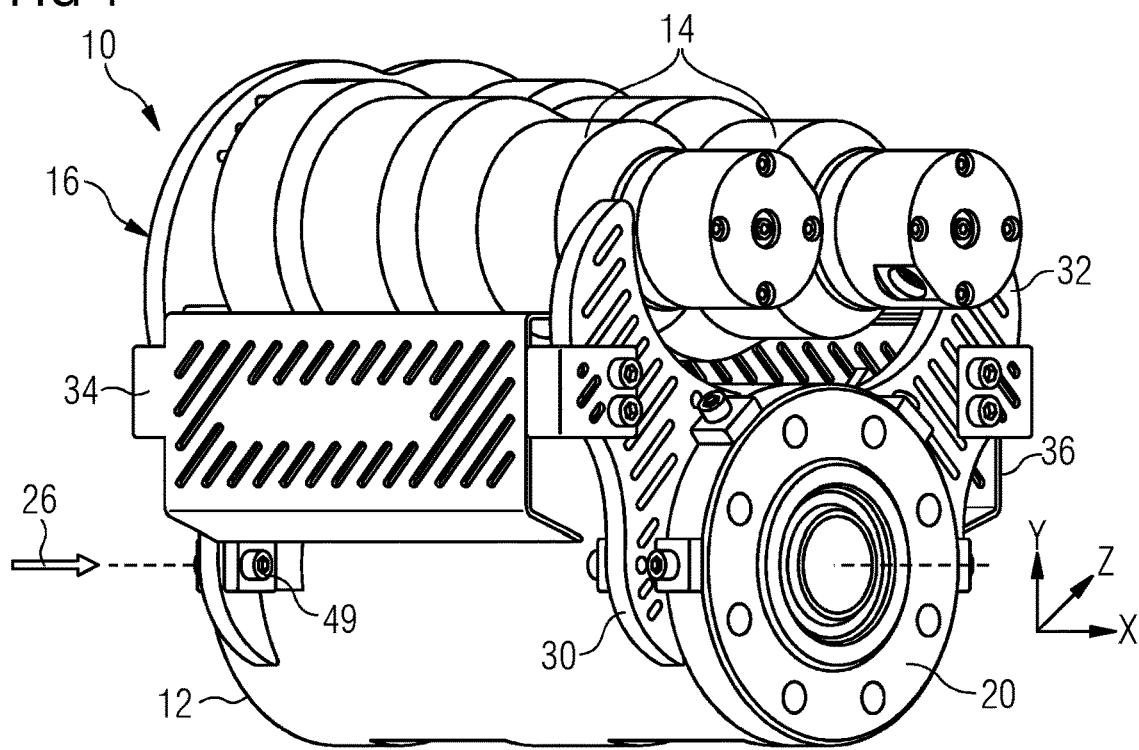
FIG. 1 is a view on a subsea equipment assembly comprising a venturi flow meter and mounted thereto a differential pressure sensor via an anti-vibration bracket and is in accordance with the present invention.
Figure 2:
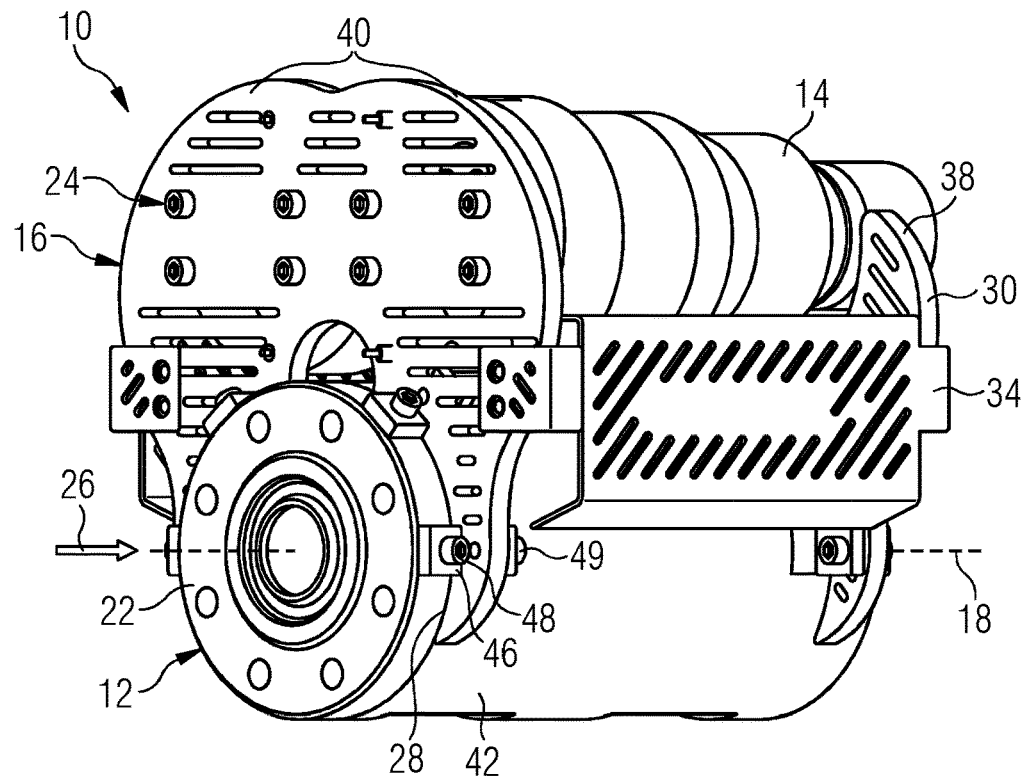
FIG. 2 is an alternative view on the subsea equipment assembly comprising a venturi flow meter and mounted thereto a differential pressure sensor via an anti-vibration bracket and is in accordance with the present invention

FIG. 1 and FIG. 2 are opposing views on a subsea equipment assembly 10 comprising a first component 12, in this example a venturi flow meter 12, and a second component 14, in this example a differential pressure sensor 14. The differential pressure sensor 14 is mounted to the venturi flow meter 12 via an anti-vibration bracket 16 and in accordance with the present invention. In this exemplary embodiment of the present invention two differential pressure sensors 14 are present. Two differential transducers 14 are provided for redundancy purposes. The venturi flow meter 12 is located along a pipeline (not shown) and which would be bolted to end flanges 20, 22. The venturi flow meter 12 has an axis 18 along which a fluid flows in use. In this example, the direction of the flow of fluid in the pipeline and passing through the venturi flow meter 12 is from left (upstream) to right (downstream) as shown by the arrow 26. The differential pressure sensor 14 is capable of measuring parameters of the fluid flowing through the venturi flow meter 12 such as flow rate and pressure within the fluid. Specifically, the differential pressure sensor 14 is measuring the differential pressure in the fluid between an inlet diameter and a restriction in the venturi flow meter 12 as known in the art.

The fluid passing through the pipeline and venturi flow meter 12 may comprise different fluids such as sea water and oil as well as solids such as sands and gravels. The different densities of the fluid and solids cause eccentric forces as the fluid is accelerated and decelerated through the venturi and which generates the vibrations. The vibrations manifest in the radial or Y-direction and axial (18) or X-direction.

As shown in FIG. 1 a reference axis is shown with X denoting the direction of the axis 18, Y is the radial direction and Z is a direction perpendicular to X and Z. An axial plane is defined by a plane that is perpendicular to the X direction or the axis 18.

The differential pressure sensor 14 is bolted to the anti-vibration bracket 16 via an array of bolts 24. The anti-vibration bracket 16 is bolted to the venturi flow meter 12 and extends radially and in an axial plane with respect to the axis 18. The anti-vibration bracket 16 is located at an upstream part of the venturi flow meter 12. At a downstream part of the venturi flow meter 12 is located a pair of brackets 30, 32. The brackets 30, 32 are bolted to the venturi flow meter 12 and extend radially and in an axial plane relative to the axis 18. A guard plate 34, 36 is mounted to each one of the brackets 30, 32 respectively and to the anti-vibration bracket 16. The guard plates 34, 36 protect the subsea equipment assembly 10 from damage such as from drag lines or fishing nets. A radially outer part 38 of the guard plates 34, 36 and a radially outer part 40 of the anti-vibration bracket 16 are curved such that objects that might otherwise snag are deflected harmlessly over the subsea equipment assembly 10. Depending on the direction cables approach the differential pressure sensor(s) 14 for example, the anti-vibration bracket 16 may be located at a downstream part of the venturi flow meter 12 and the pair of brackets 30, 32 are located at an upstream part of the venturi flow meter 12.

Figure 3:
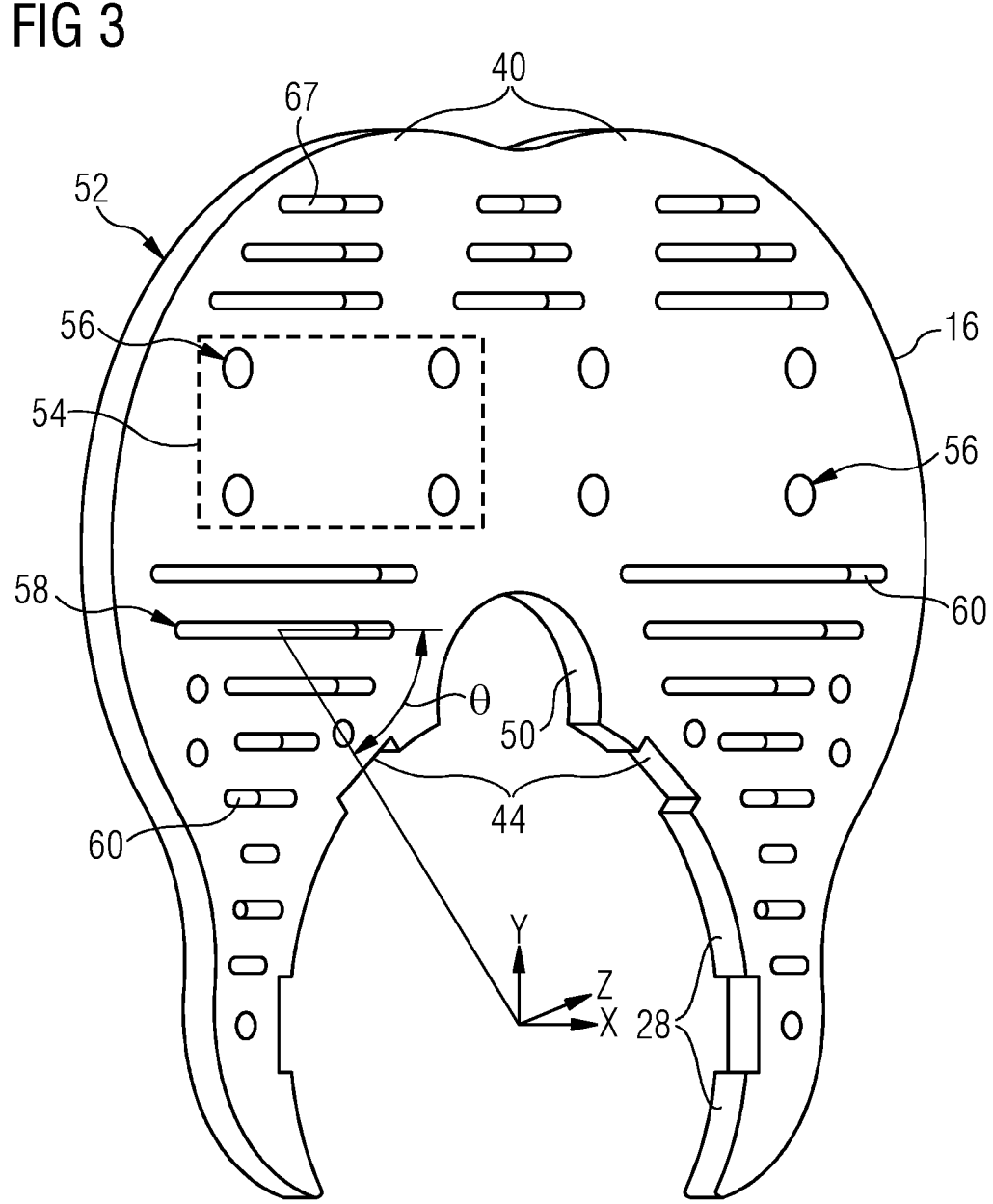
FIG. 3 is a view on one of the anti-vibration brackets and in accordance with the present invention.
Figure 4:
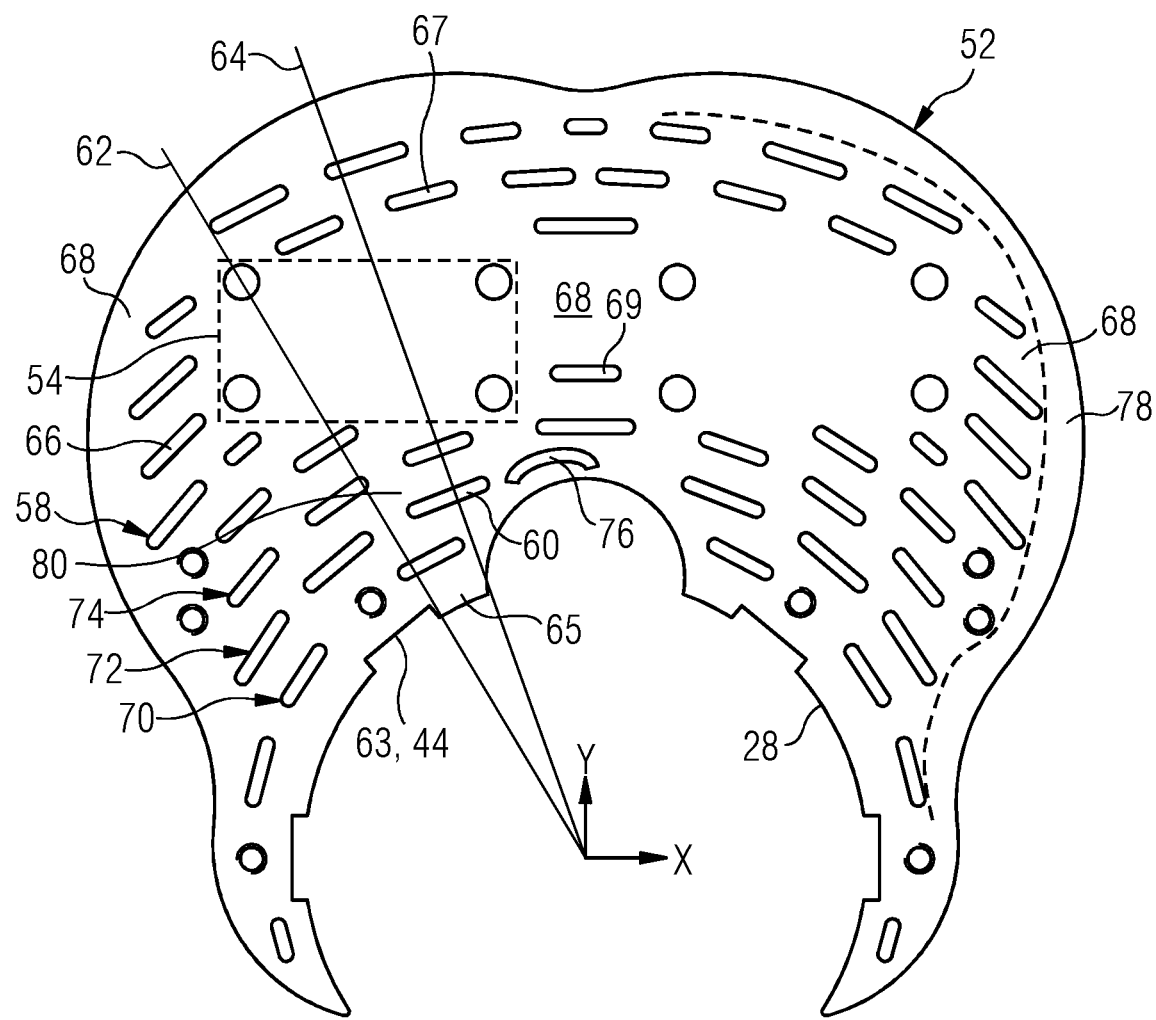
FIG. 4 is a view on another embodiment of the anti-vibration bracket and in accordance with the present invention.

Referring now to FIG. 3 and FIG. 4 which are views on different embodiments of the anti-vibration bracket 16 and which are in accordance with the present invention. In FIGS. 3 and 4, like features are denoted by the same reference numbers. In use, fluid passing through the venturi flow meter 12 causes vibrations. Previously, these vibrations can cause damage to components such as the differential pressure sensor 14, welds and bolts of the subsea equipment assembly 10.

The present anti-vibration bracket 16 is generally plate-like in form and has a plate portion 52 having a thickness. The anti-vibration bracket 16 is metallic and preferably a stainless steel, but other metals and alloys may be used and particularly those that are resistant to corrosion in harsh environments such as sea water. The anti-vibration bracket 16 comprises an edge 28 which is a complementary shape to the outer surface 42 (see FIG. 2) of the venturi flow meter 12. The edge 28 is the radially innermost part of the anti-vibration bracket 16 when assembled to the subsea equipment assembly 10. In these embodiments the plate portion 52 is arranged in an axial plane relative to the axis 18 and therefore extends generally radially outwardly. In other examples, the anti-vibration bracket 16 may be arranged such that the plate portion 52 is at an angle to the radial direction and the axial plane.

In an assembled state, the edge 28 is in contact with the outer surface 42 of the venturi flow meter 12, although depending on tolerances or in another embodiment there may be a gap between the edge 28 and the outer surface 42. The edge 28 comprises a number of notches 44 which are provided to accommodate a foot 46. Bolt 48 secures the foot 46 to the venturi flow meter 12 and bolt 49 secures the anti-vibration bracket 16 and the foot 46 together. In this example, a cut-out 50 is provided in the edge 28 so that the anti-vibration bracket 16 avoids contact with a lifting hook (not shown) that is fixed to the venturi flow meter 12. In other examples of the present anti-vibration bracket 16 there may be no need for a cut-out 50. Further, other attachment means to the foot 46 may be used and therefore in other examples of the anti-vibration bracket 16 there may be no notches 44.

The plate portion 52 comprises an attachment region 54 located a radial distance away from the venturi flow meter 12. The differential pressure sensor 14 is attached to the attachment region 54 via the array of bolts 24 (shown in FIG. 2). The array of bolts 24 engage an array of bolt holes 56 provided in the anti-vibration bracket 16 and in this example in the plate portion 52. In this example, two arrays of bolts 24 and holes 56 are provided for the two differential pressure sensors 14 seen in FIGS. 1 and 2. It should be appreciated that other attachment means, such as welding, can be used to attach the differential pressure sensors 14 to the anti-vibration bracket 16.

The anti-vibration bracket 16 comprises an array of slots 58 with individual slots denoted by reference 60. At least some of the slots 60 are located between the venturi flow meter 12 and the attachment region 54. The array of slots 58 is arranged such that any radial line, e.g., radial lines 62 and 64, passes through at least one of the slots 60 and either a contact point 65 or an attachment region 63 (of the edge 28) between the anti-vibration bracket 16 and the venturi flow meter 12 or where the anti-vibration bracket 16 is attached to the venturi flow meter 12, i.e. an attachment region 63 and in this case notch 44. As mentioned previously, the venturi flow meter 12 is caused to vibrate predominantly in a radial direction because of the fluid passing therethrough. The vibrations are transmitted through the anti-vibration bracket 16 in a radial direction and from or through any point of contact like the contact point 65 or attachment region 63. The direct radial path of the vibrations passes through at least one slot 60 so that the vibrations cannot pass directly into the attachment region 54 and thereby cannot pass directly to the differential pressure sensor 14. The attachment region 54 and the differential pressure sensor(s) 14 are at least partly isolated from the source of the vibrations emanating into the anti-vibration bracket 16. The array of slots 58 provides a region 80 that is more flexible or of reduced elastic modulus compared to the plate 52 without an array of slots 58. The region 80 is situated between, in a direct line from the source of vibrations, the attachment region 54 and the edge 28 and in particular in a radial line 62, 64 with the contact point 65 or attachment region 63. Therefore, vibrations from the venturi flow meter 12 are at least partly damped by the anti-vibration bracket 16 before reaching the differential pressure sensor 14. In this way, vibrational forces transmitted to the differential pressure sensor 14, welds and bolts are reduced and allows these features to have a greater service life and be more reliable than previously.

Vibration damping for the differential pressure sensor 14 by the anti-vibration bracket 16 is enhanced where at least some of the slots 67 of the array of slots 58 are located radially outwardly of the attachment region 54. These slots 67 further isolate the attachment region 54 such that the region of the plate portion radially outward of the attachment region 54 is more flexible or has a reduced elastic modulus compared to a plate 52 region without an array of slots 58. These slots 67 further dissipate the energy of the vibrations and enhance damping of the vibrations that might reach the differential pressure sensor(s) 14.

Vibration damping by the anti-vibration bracket 16 is further enhanced where at least some of the slots 66, 69 of the array of slots 58 are located to one or both lateral sides 68 of the attachment region 54. Where there are two differential pressure sensors 14 or attachment regions 54, some of the slots 69 are located there between. These slots 66, 69 yet further isolate the attachment region 54 such that the region of the plate portion laterally of the attachment region 54 is yet more flexible or has yet further reduced elastic modulus compared to a plate 52 region without an array of slots 58. These slots 66, 69 further dissipate the energy of the vibrations and enhance damping of the vibrations that might reach the differential pressure sensors 14.

At least some of the slots 60 of the array of slots 58 are arranged in at least two rows, e.g., rows 70, 72 and 74, with respect to the radial direction. The slots 60 in each row 70, 72 and 74 are off-set from one another such that there is no clear 'line of sight' in the radial direction such that the radial line(s) 62, 64 passes through at least one slot 60. The region of the plate portion 52 having the array of slots 58 and in particular the spaced apart rows 70, 72, 74 has sufficient strength to support and attached together the components 12, 14, but also provides sufficient flexibility to dissipate and dampen the vibrations. Here, the length of each slot 60 in one row, e.g. row 72, is greater than the gap between adjacent slots 60 in another row, e.g. row 70, such that there is no clear line of sight for vibrations to pass directly to the attachment region 54 as explained above. The length of each slot 60 in any row 70, 72, 74 may be the same length or may have different lengths. Different slot lengths may be required depending on the anti-vibration bracket's 16 geometry. Similarly, the gaps between adjacent slots 60 in any one or more of the rows 70, 72, 74 may vary to accommodate requirements such as geometry and/or structural integrity.

In general, and as can be seen in FIG. 4, the slots 60, 66, 67, 69 are arranged such that their or longest aspect is generally perpendicular to a radial line 62, 64 that intercepts a mid-point or centre-point of the slot 60, 66, 67, 69. However, this is not always possible because of the geometry of the plate 52, and it is preferable that some of the slots 60, 66, 67, 69 of the array of slots 58 are arranged such that their longitudinal axis or longest aspect has an angle Θ that is between −60° and +60°, but preferably between −15° and +15° to a radial line 62, 64 and at the centre-point of each slot 60, 66, 67, 69.

The slots 60, 66, 67, 69 are shown as straight, however, at least some of the slots 76 may be curved and preferably the curved slots 76 have a curvature with a constant radius which is a radius from the axis 18. All of the slots 60, 66, 67, 69, 76 of the array of slots 58 may be curved. The curved slots 76 can assist in providing more even spacing between each slot in the row of slots 70, 72, 74 and/or between rows of slots 70, 72, 74.

The slots 60 are shown as elongate and with an aspect ratio >1, preferably >2, but in other embodiments the slots 60 may have an aspect ratio of 1. Typically, the aspect ratio, length/width, of at least some of the slots 60 is between 2 and 20. Where, each slot may have an aspect ratio between 2 and 20. These slots 60 of the array of slots 58 are located between the first component 12 and the attachment region 54.

The anti-vibration bracket 16 comprises an edge region 78 where there are no slots, i.e., the array of slots 58 is not within the edge region 78. This forms a 'picture frame' and provides structural integrity to the anti-vibration bracket 16.

In the Figures, the slots 60, 66, 67, 69, 76 are shown as extending completely through the anti-vibration bracket 16, i.e., the slots are apertures. The slots 60, 66, 67, 69, 76 may be formed by water jet or laser cutting for example. It is possible for the slots 60, 66, 67, 69, 76 to extend only partly through the anti-vibration bracket 16. In this case the slots 60, 66, 67, 69, 76 may be formed by milling with an end cutter. Nonetheless, where the slots 60, 66, 67, 69, 76 do not extend completely through the anti-vibration bracket 16 the thinner section remaining within the slot provides the region 80 that is more flexible or of reduced elastic modulus compared to a plate 52 where there is no array of slots 58.

All the features disclosed in this specification (including any accompanying claims, abstract and drawings), and/or all the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A subsea equipment assembly, comprising:
   a first component having an axis,
   a second component, and
   an anti-vibration bracket, wherein the anti-vibration bracket is attached to the first component and the second component,
   wherein, in use, the first component is caused to vibrate at least in a radial direction relative to the axis,
   wherein the anti-vibration bracket comprises a plate portion,
   wherein the plate portion extends at least radially away from the first component and comprises an attachment region located a radial distance away from the first component, wherein the second component is attached to the attachment region, and
   wherein the anti-vibration bracket comprises an array of slots, at least some of the slots of the array of slots are located between the first component and the attachment region, and wherein at least some of the slots of the array of slots are located to a lateral side of the attachment region.

2. The subsea equipment assembly as claimed in claim 1, wherein at least some of the slots of the array of slots are arranged in at least one row with respect to the radial direction.

3. The subsea equipment assembly as claimed in claim 1, wherein the array of slots is arranged such that any radial line passes through at least one of the slots and either a contact point between the anti-vibration bracket and the first component or where the anti-vibration bracket is attached to the first component.

4. The subsea equipment assembly as claimed in claim 1, wherein at least some of the slots of the array of slots are arranged such that their centreline is at an angle (0) to a radial line, the angle (0) is between −45° and +45°.

5. The subsea equipment assembly as claimed in claim 1, wherein at least some of the slots of the array of slots are curved.

6. The subsea equipment assembly as claimed in claim 1, wherein the anti-vibration bracket comprises an edge region and none of the slots the array of slots are within the edge region.

7. The subsea equipment assembly as claimed in claim 1, wherein at least some of slots of the array of slots extend through the anti-vibration bracket.

8. The subsea equipment assembly as claimed in claim 1, wherein at least some of slots of the array of slots extend partly through the anti-vibration bracket.

9. The subsea equipment assembly as claimed in claim 1, wherein the first component is a venturi flow meter and the second component is a differential pressure sensor.

10. The subsea equipment assembly as claimed in claim 1, wherein at least some of the slots of the array of slots have an aspect ratio between and including 2 and 20.

11. The subsea equipment assembly as claimed in claim 10, wherein a radial line from the axis passes through the slots.

12. The subsea equipment assembly as claimed in claim 10, wherein the slots are located between the first component and the attachment region.

13. The subsea equipment assembly as claimed in claim 4, wherein the angle ($\theta$) is between −15° and +15°.

14. The subsea equipment assembly as claimed in claim 5, wherein at least some of the slots of the array of slots have a curvature with a constant radius.

15. The subsea equipment assembly as claimed in claim 5, wherein at least some of the slots of the array of slots have a curvature with a constant radius and a radius from the axis.

16. A subsea equipment assembly, comprising:
a first component having an axis,
a second component, and
an anti-vibration bracket, wherein the anti-vibration bracket is attached to the first component and the second component,
wherein, in use, the first component is caused to vibrate at least in a radial direction relative to the axis,
wherein the anti-vibration bracket comprises a plate portion,
wherein the plate portion extends at least radially away from the first component and comprises an attachment region located a radial distance away from the first component, wherein the second component is attached to the attachment region, and
wherein the anti-vibration bracket comprises an array of slots, at least some of the slots of the array of slots are located between the first component and the attachment region, and wherein at least some of the slots of the array of slots are located radially outwardly of the attachment region.

17. A subsea equipment assembly, comprising:
a first component having an axis,
a second component, and
an anti-vibration bracket, wherein the anti-vibration bracket is attached to the first component and the second component,
wherein, in use, the first component is caused to vibrate at least in a radial direction relative to the axis,
wherein the anti-vibration bracket comprises a plate portion,
wherein the plate portion extends at least radially away from the first component and comprises an attachment region located a radial distance away from the first component, wherein the second component is attached to the attachment region, and
wherein the anti-vibration bracket comprises an array of slots, at least some of the slots of the array of slots are located between the first component and the attachment region, wherein at least some of the slots of the array of slots are arranged in at least one row with respect to the radial direction, and wherein at least some of the slots of the array of slots are arranged in at least two rows with respect to the radial direction.

* * * * *